US012804577B2

(12) United States Patent
Jiang

(10) Patent No.: US 12,804,577 B2
(45) Date of Patent: Nov. 17, 2026

(54) UPLINK SYNCHRONIZATION METHOD AND APPARATUS, AND READABLE STORAGE MEDIUM

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 304 days.

(21) Appl. No.: 18/710,149

(22) PCT Filed: Nov. 15, 2021

(86) PCT No.: PCT/CN2021/130727

§ 371 (c)(1),
(2) Date: May 14, 2024

(87) PCT Pub. No.: WO2023/082272

PCT Pub. Date: May 19, 2023

(65) Prior Publication Data

US 2025/0031165 A1 Jan. 23, 2025

(51) Int. Cl.

*H04W 56/00* (2009.01)
*H04W 72/11* (2023.01)
*H04W 76/20* (2018.01)

(52) U.S. Cl.

CPC ... *H04W 56/0045* (2013.01); *H04W 56/0015* (2013.01); *H04W 72/11* (2023.01); *H04W 76/20* (2018.02)

(58) Field of Classification Search

CPC ......... H04W 56/0045; H04W 56/0015; H04W 72/11; H04W 76/20; H04B 7/18513

See application file for complete search history.

(56) References Cited

U.S. PATENT DOCUMENTS

2021/0378028 A1* 12/2021 Wu ..................... H04W 74/002
2022/0232503 A1* 7/2022 Cheng ................. H04W 56/009
2023/0068762 A1* 3/2023 Lin .................... H04B 7/18504

(Continued)

FOREIGN PATENT DOCUMENTS

CN 109246734 A 1/2019
CN 110896560 A 3/2020

(Continued)

OTHER PUBLICATIONS

Chinese Patent Application No. 202180003815.3, Office Action dated Sep. 4, 2023, with English translation, 15 pages.

(Continued)

*Primary Examiner* — Chae S Lee
(74) *Attorney, Agent, or Firm* — Cozen O'Connor

(57) ABSTRACT

A method for uplink (UL) synchronization, performable by a user equipment (UE), includes: determining an expiration of a UL synchronization validity timer related to timing advance (TA) pre-compensation reference information; and initiating a radio link failure (RLF) procedure or a non-RLF procedure to acquire a system message carrying the TA pre-compensation reference information; in which the TA pre-compensation reference information includes at least one of ephemeris information or a common TA.

20 Claims, 5 Drawing Sheets

(56) References Cited

U.S. PATENT DOCUMENTS

| | | | | |
|---|---|---|---|---|
| 2023/0098798 | A1 * | 3/2023 | Cheng | H04W 76/30 370/503 |
| 2024/0314664 | A1 * | 9/2024 | Sharma | H04W 36/08 |
| 2024/0340074 | A1 * | 10/2024 | Yan | H04W 56/0005 |
| 2025/0323853 | A1 * | 10/2025 | Wang | H04B 7/18513 |

FOREIGN PATENT DOCUMENTS

| | | | |
|---|---|---|---|
| CN | 112771943 | A | 5/2021 |
| CN | 113271135 | A | 8/2021 |
| CN | 113630863 | A | 11/2021 |

OTHER PUBLICATIONS

European Patent Application No. 21963718.8, Search and Opinion dated Dec. 23, 2024, 8 pages.
Mediatek "Summary #3 of AI 8.15.2 Enhancements to time and frequency synchronization" 3GPP TSG RAN WG1 Meeting #105-e, R1-2106191, May 2021, 64 pages.
OPPO "Report of [AT116-e][028][IoT-NTN] User Plane Impact (OPPO)" 3GPP TSG-RAN WG2 Meeting #116 electronic, R2-211xxxx, Nov. 2021, 33 pages.
PCT/CN2021/130727 International Search Report dated Mar. 9, 2022, 3 pages.
ITRI "Discussion on NTN TA pre-compensation" 3GPP TSG RAN WG2 Meeting #113 electronic, R2-2100828 Jan.-Feb. 2021, 3 pages.
Sony "Discussion on TA compensation and adjustment in NTN" 3GPP TSG RAN WG1 #99, R1-1912348, Nov. 2019, 5 pages.

* cited by examiner

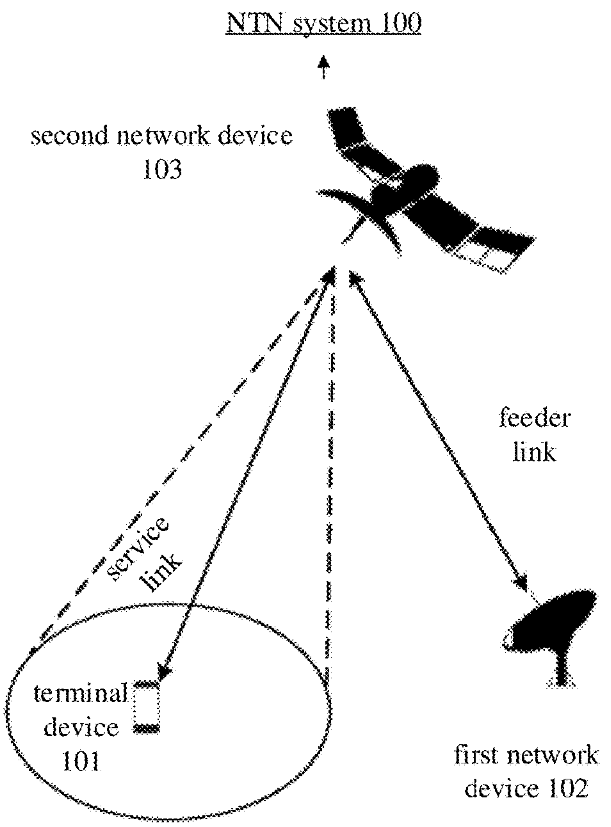

FIG. 1

| Platforms | Altitude Range | Orbit | Typical Beam Footprint Size |
|---|---|---|---|
| low-earth-orbit (LEO) satellite | 300~1500 km | orbit around the earth | 100~1000 km |
| medium-earth-orbit (MEO) satellite | 7000~25000 km | | 100~1000 km |
| GEO satellite | 35 786 km | Notional station keeping position fixed in terms of elevation/azimuth with respect to a given earth point | 200~3500 km |
| UAV Platform | 8~ 50 km (20 km for HAPS) | | 5 - 200 km |
| Highly-elliptical-orbit (HEO) satellite | 400~50000 km | ellipse around the earth | 200~3500 km |

FIG. 2

UPLINK SYNCHRONIZATION METHOD AND APPARATUS, AND READABLE STORAGE MEDIUM

CROSS-REFERENCE TO RELATED APPLICATION

This application is a national phase of International Application No. PCT/CN2021/130727, filed on Nov. 15, 2021, the entire contents of which are incorporated herein by reference.

TECHNICAL FIELD

The disclosure relates to the field of wireless communication technologies, and particularly to a method and an apparatus for uplink (UL) synchronization, and a readable storage medium.

BACKGROUND

Non-terrestrial networks (NTN) communication has been introduced into 5th generation (5G) wireless communication technologies. In the NTN communication, a user equipment (UE) acquires radio resources through either a satellite or an unmanned aerial vehicle (UAV).

Ensuring uplink (UL) and downlink (DL) synchronization is crucial for a 5G network. For a network device, there exists a delay between a UL timing at which a UL signal from the UE is received and a DL timing at which a DL signal is transmitted. Moreover, these delays vary for different UEs, causing UL timings of different UEs not to align on the network device side. Consequently, this misalignment may lead to the potential interference in data transmission among UEs.

SUMMARY

According to a first aspect of the disclosure, a method for UL synchronization is provided. The method is performed by a UE. The method includes: determining an expiration of a UL synchronization validity timer related to TA pre-compensation reference information; and initiating a radio link failure (RLF) procedure or a non-RLF procedure to acquire a system message carrying the TA pre-compensation reference information; in which the TA pre-compensation reference information includes at least one of ephemeris information or a common TA.

According to a second aspect of the disclosure, a method for UL synchronization is provided. The method is performed by a first network device. The method includes: determining a UE initiating an RLF procedure or a non-RLF procedure; and transmitting a system message carrying TA pre-compensation reference information to the UE; in which the TA pre-compensation reference information includes at least one of ephemeris information or a common TA, and the UE is configured to initiate the RLF procedure or the non-RLF procedure in response to an expiration of the UL synchronization validity timer related to the TA pre-compensation reference information.

According to a third aspect of the disclosure, a communication apparatus is provided. The communication apparatus may be configured to perform steps executed by a UE in the above first aspect.

It is to be understood that both the foregoing general descriptions and the following detailed descriptions are exemplary and explanatory only and are not restrictive of the disclosure.

BRIEF DESCRIPTION OF THE DRAWINGS

The accompanying drawings described herein are provided for the further understanding of embodiments of the disclosure, and constitute a part of the disclosure, and examples and descriptions of embodiments of the disclosure are used to explain embodiments of the disclosure, and may not constitute a limitation of embodiments of the disclosure. In the accompanying drawings, the accompanying drawings are incorporated into the specification and constitute a part of the specification, show examples in conformity with embodiments of the disclosure, and explain the principle of the disclosure together with the specification.

FIG. 1 is an architecture diagram illustrating an NTN system according to embodiments of the disclosure.

FIG. 2 is a diagram illustrating related information of a satellite in NTN according to embodiments of the disclosure.

DETAILED DESCRIPTION

Figure 3:
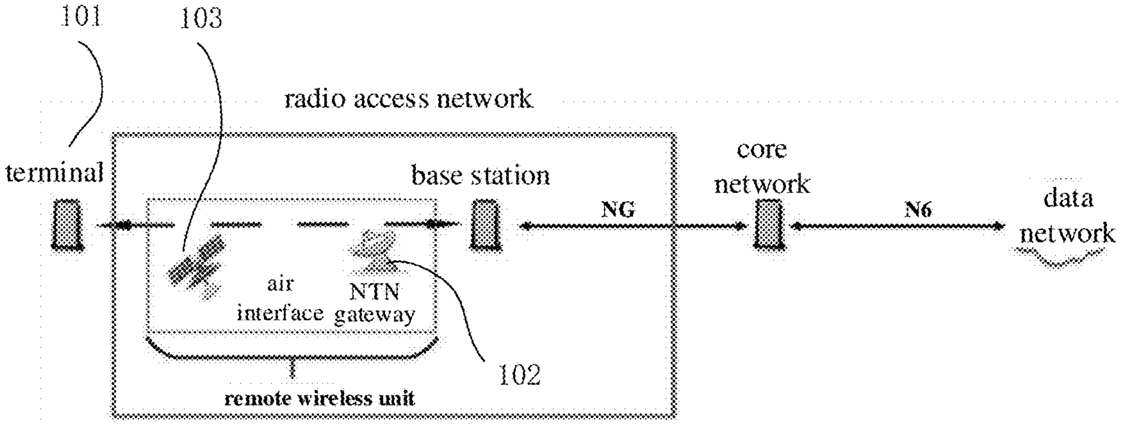
FIG. 3 is a diagram illustrating a transparent transmission mode in NTN according to embodiments of the disclosure.

Embodiments of the disclosure are further described below with reference to accompanying drawings and implementations.

The embodiments will be described herein in detail, and examples thereof are illustrated in the accompanying drawings. When the following descriptions refer to the accompanying drawings, same numbers in different drawings represent same or similar elements unless otherwise indicated. The implementations described in the following embodiments do not represent all implementations consistent with the embodiments of the disclosure. Rather, they are merely examples of apparatuses and methods consistent with some aspects of the disclosure as detailed in the appended claims.

To eliminate disparities in delays among UEs, the network device transmits a timing advance (TA) adjustment command, thereby advancing the UL timing of the UE by a specific interval, ensuring that the UL timings of all UEs align upon arrival at the base station side. In a random access procedure, each UE transmits a preamble over a random access channel (RACH), after which the network device indicates a TA value within a random access response message transmitted back to the UE, according to the detected preamble, to calibrate the UL timing of the UE.

For terrestrial networks (TN), the base station may determine the TA value according to the preamble. For the NTN, disparities in delays among various UEs may be significantly larger, preventing the network device from directly determining TA adjustment information for the UL timing of the UE just based on the preamble. Hence, a TA pre-compensation approach is needed. Presently, the TA pre-compensation-related information comes with a corresponding validity period, and beyond this period, the UE is incapable of applying the pre-compensation once the information becomes invalid.

A method for UL synchronization according to embodiments of the disclosure is applied to an NTN system 100. FIG. 1 illustrates an architecture of a possible NTN/TN system applicable in embodiments of the disclosure. The system 100 may include a user equipment (UE) 101, a first network device 102, and a second network device 103. A communication link between the first network device 102 and the second network device 103 is a feeder link. A communication link between the second network device 103 and the UE 101 is a service link.

The UE 101 may refer to a wireless terminal device capable of receiving scheduling and indication information from the network device, for example, a device that provides voice and/or data connectivity for a user, a handheld device having a wireless connection function, or other processing devices connected to a radio modem. The UE 101 may communicate with one or more core networks or internets via a radio access network (RAN). The wireless terminal device may be a mobile terminal device, for example, a mobile phone (or referred to as a cellular phone), a computer, and a communication chip of the UE 101, such as, a portable, pocket, handheld, computer built-in, or vehicle-mounted mobile apparatus that may exchange language and/or data with a wireless access network. The terminal may include a device such as a personal communication service (PCS) phone, a cordless telephone, a session initiated protocol (SIP) phone, a wireless local loop (WLL) station, a personal digital assistant (PDA), a Pad, and a computer having a wireless transceiving function. The terminal further may include, a subscriber unit, a subscriber station, a mobile station, a mobile station (MS), a remote station, an access point (AP), a remote terminal, an access terminal, a user terminal, a user agent, a subscriber station (SS), a customer premises equipment (CPE), a terminal, or a mobile terminal (MT). The wireless terminal device may also include a wearable device, a terminal device in a next generation communication system, for example, a 5G network or a future evolved public land mobile network (PLMN), or a terminal device in a new radio (NR) communication system.

The first network device 102 may be a gateway station or a ground station, an earth station, or a gateway, which may be configured to connect the second network device 103 and the core network.

The second network device 103 may be a satellite (or referred to as a satellite base station), a geostationary earth orbit (GEO) satellite, a medium earth orbit (MEO) satellite and a low earth orbit (LEO) satellite in a non-geostationary earth orbit (NGEO), or a high altitude platform station (HAPS), which are not limited in the disclosure. FIG. 2 illustrates an altitude, an orbit, and a coverage of a satellite 103 in a typical NTN.

For the second network device 103, the satellite processes signals using two manners: a transparent transmission mode and a regenerative mode. FIG. 3 is a diagram of a transparent transmission mode and FIG. 4 is a diagram of a regenerative mode.

In the transparent transmission mode as illustrated in FIG. 3, an NTN ground station 102 transmits a signal of a gNB to a satellite 103. Upon reception, the satellite 103 converts the signal into a signal in a satellite frequency band, and transmits the satellite-frequency-band signal to the UE. In the transparent transmission mode, the satellite 103 is similar to a repeater, refraining from demodulating the signal of the gNB beyond conducting the necessary frequency conversion and signal amplification.

Figure 4:
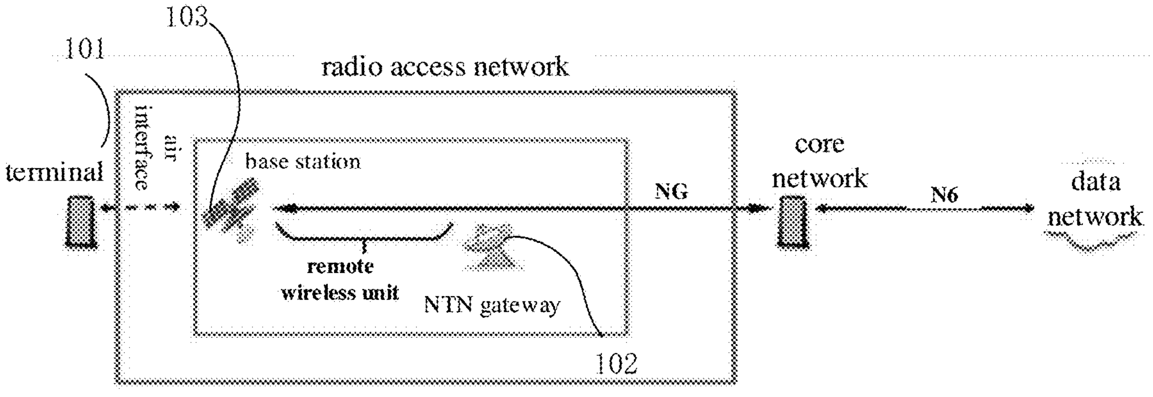
FIG. 4 is a diagram illustrating a regenerative mode in NTN according to embodiments of the disclosure.

In the regenerative mode as illustrated in FIG. 4, the NTN ground station 102 transmits the signal of the gNB to the satellite 103, and the satellite 103 first demodulates and decodes the signal, then encodes and modulates the signal again (that is, a regenerative process), and transmits the regenerative signal to the UE 101 via a satellite frequency band.

In 5G communication, downlink (DL) synchronization means a process where the UE 101 realizes the DL synchronization by receiving a DL synchronization signal from the network device 103. After realizing the DL synchronization, the UE needs to perform UL synchronization, to ensure that arrival timings of uplink signals from all UEs at the network device aligns with the uplink timing of the network device.

The UL synchronization is accomplished through a random access initiated by the UE. The UE 101 transmits a preamble to the network device. The network device acquires a transmission delay between the UE and the network device by receiving the preamble, and transmits a timing advance (TA) command to the UE. A TA value is set to twice the transmission delay. The UE realizes the UL synchronization by advancing UL according to a value indicated by the TA.

Due to a one-way propagation delay experienced by the DL signal as it travels from the network device to the UE 101, the DL timing perceived by the UE upon receiving the DL signal is delayed by this one-way propagation delay compared to when the base station actually transmits the DL signal. After aligning its UL timing with the DL timing, when the UE transmits the UL signal, it needs to endure a one-way propagation delay before the signal reaches the network device. As a result, for the network device, the UL timing at which the uplink signal of the UE is received is effectively delayed by a full round-trip time (RTT) relative to the DL timing when the downlink signal was originally transmitted.

Given that RTTs associated with different UEs may vary, UL timings for these UEs are not synchronized at the network device side, leading to interferences during data transmission among these UEs. The network device may issue a TA adjustment command, prompting the UEs to advance their UL timings by an amount equivalent to their respective RTTs. This ensures that the UL timings of all UEs are aligned when their signals reach the base station.

In a random access procedure, when the UE transmits a preamble at a random access channel (RACH) occasion (denoted as RO), the network device needs to know the transmission RO corresponding to the received preamble when receiving the preamble, so that the network device may correctly address the random access request when responding to the random access request and make the UL timing adjustment accordingly.

The preamble design in the TN permits a maximum RTT of 0.68 milliseconds (corresponding to a coverage radius of 100 kilometers), which is less than a subframe. Therefore, a subframe in which the network device receives the preamble is the same as an RO subframe corresponding to the transmission of the preamble. A UL timing deviation may be obtained based on a subframe boundary deviation. The TA may be determined after the UL timing deviation is determined.

In the NTN, RTT differences among different UEs 101 arriving at the first network device 102 may be as high as 10.3 milliseconds, implying that delay variations among these UEs are significantly larger. The first network device 102 may not infer the transmission RO subframe of the received preamble and the UL timing deviation from the received preamble. Unless an interval between ROs is greater than a maximum RTT difference, so that it ensures that preamble receiving windows of different ROs do not overlap, which will bring a great limitation on RO resources.

In the NTN context, ambiguity of receiving the preamble may be adjusted via the TA pre-compensation, that is, before the UE 101 transmits the preamble, the UL timing of the UE 101 is advanced by an RTT between the UE 101 and the first network device 102, to ensure that the time differences between different UEs arriving at the base station using a preamble transmitted at the same RO are limited within one subframe.

In the NTN, the RTT between the UE 101 and the first network device 102 includes two parts, one of which is an RTT of a service link between the UE 101 and the satellite 103, which is a UE specific TA, and the other of which is an RTT of a feeder link between the satellite 103 and the first network device 102, which is a common TA. One part of the common TA may be compensated by the first network device 102 and another part of the common TA may be compensated by the UE 101. The part compensated by the UE 101 is transmitted to the UE 101 by the first network device 102 via a system message.

In addition to broadcasting the common TA that needs to be compensated by the UE 101, the first network device 102 may broadcast satellite ephemeris information to assist the UE 101 in determining a position of the satellite 103, thus enabling the calculation of the RTT between the UE 101 and the satellite 103. Due to the mobility of the satellite, both the common TA and the ephemeris information may change over time. Consequently, there will be a UL synchronization validity timer for the ephemeris information and the common TA broadcast in a System Information Block (SIB).

In related art, a UE in a connected state (for example, an internet of things (IoT) terminal) may support that the SIB only is acquired when it executes a radio link failure (RLF). When the UL synchronization validity timer expires, it means that ephemeris information and common TA information previously received from the SIB have become invalid. Consequently, the UE101 may not obtain the position of the satellite 103, may not calculate the RTT between the UE 101 and the satellite 103, and may not perform the TA pre-compensation, which ultimately results in the out-of-synchronization (UL synchronization loss).

After the UL synchronization loss, the UE needs to re-acquire the SIB. However, considering that the UE does not support acquiring the SIB in any connected state apart from during the RLF, it is suggested to initiate either the RLF procedure or a new dedicated procedure to facilitate the reacquisition of the SIB by the UE.

Figure 5:
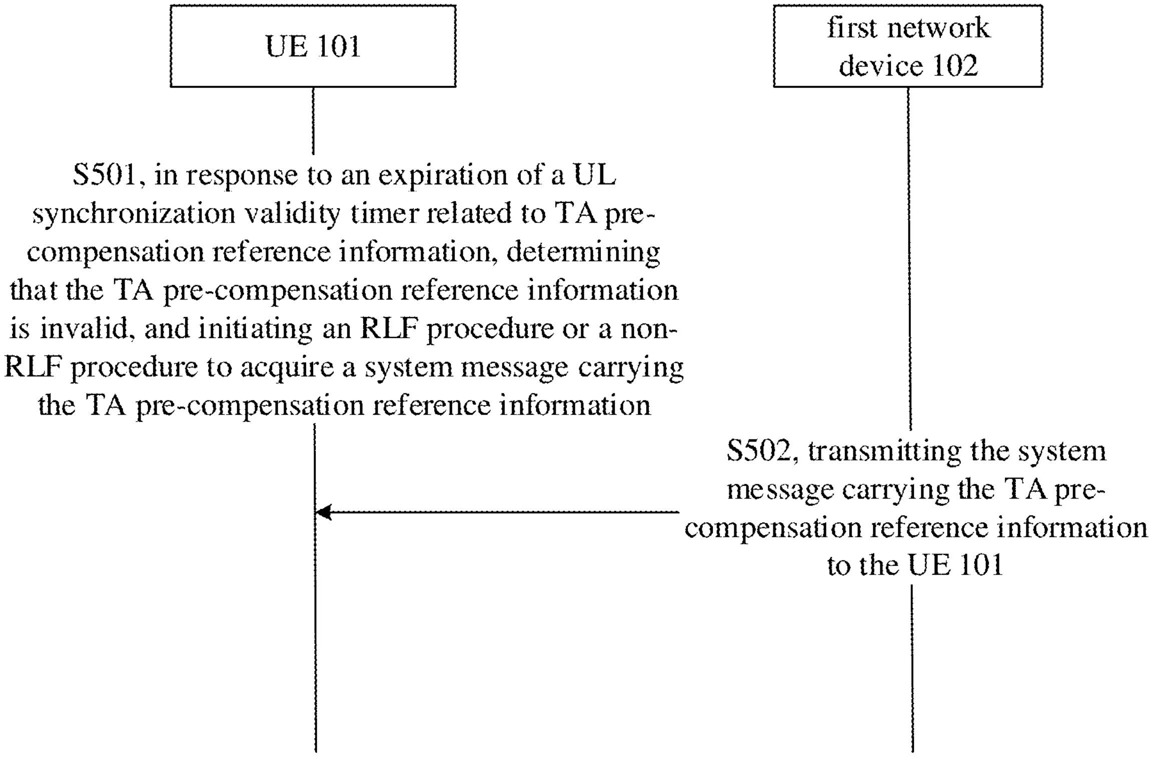
FIG. 5 is a flowchart illustrating a method for UL synchronization according to some embodiments.

A method for UL synchronization is provided according to embodiments of the disclosure. Referring to FIG. 5, FIG. 5 is a flowchart illustrating a method for UL synchronization according to some embodiments. As illustrated in FIG. 5, the method includes following steps.

At step S501, the UE 101, in response to an expiration of a UL synchronization validity timer related to TA pre-compensation reference information, determines that the TA pre-compensation reference information is invalid, and initiates an RLF procedure or a non-RLF procedure to acquire a system message carrying the TA pre-compensation reference information. The TA pre-compensation reference information includes at least one of ephemeris information or a common TA.

At step S502, the first network device 102, in response to the RLF procedure or the non-RLF procedure initiated by the UE 101, transmits the system message carrying the TA pre-compensation reference information to the UE. The TA pre-compensation reference information includes at least one of the ephemeris information or the common TA.

In some possible implementations, the system message includes a master information block (MIB) and a plurality of system information blocks (SIBs).

According to embodiments of the disclosure, when the TA pre-compensation reference information becomes invalid, the UE 101 may proactively acquire the system message carrying the TA pre-compensation reference information from the first network device 102. This enables the UE 101 to reacquire current valid TA pre-compensation reference information, facilitating the execution of the TA pre-compensation and ensuring the UL synchronization. Moreover, the UE 101 is not limited to proactively acquiring the system message via initiating the RLF procedure; it may also acquire the system message by initiating the non-RLF procedure. Thus, the UE in the connected state may acquire the TA pre-compensation reference information through the system message, regardless of whether it utilizes the RLF or non-RLF procedures.

Figure 6:
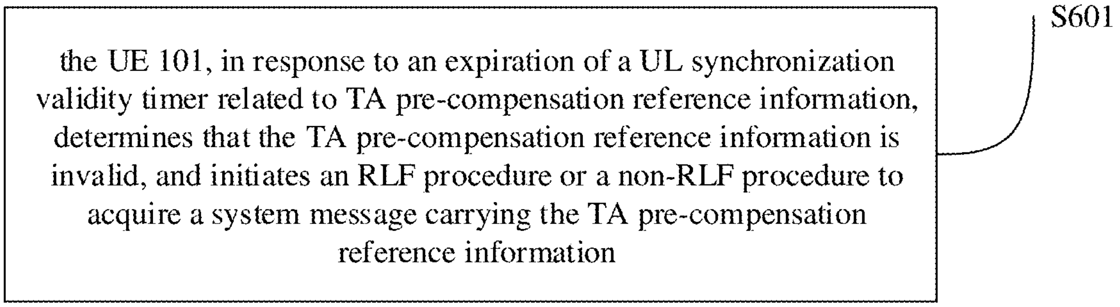
FIG. 6 is a flowchart illustrating a method for UL synchronization according to other embodiments.

A method for UL synchronization is provided according to embodiments of the disclosure. The method is performed by the UE 101. Referring to FIG. 6, FIG. 6 is a flowchart illustrating a method for UL synchronization according to some embodiments. As illustrated in FIG. 6, the method includes following step.

At step S601, the UE 101, in response to an expiration of a UL synchronization validity timer related to TA pre-compensation reference information, determines that the TA pre-compensation reference information is invalid, and initiates an RLF procedure or a non-RLF procedure to acquire a system message carrying the TA pre-compensation reference information. The TA pre-compensation reference information includes at least one of ephemeris information or a common TA.

In some possible implementations, the UE may initiate a UL synchronization validity timer at an epoch time corresponding to the ephemeris information or the common TA in the system message.

In some possible implementations, the TA pre-compensation reference information includes the ephemeris information and the common TA.

In an example, the ephemeris information and the common TA are carried in the same system message, and the ephemeris information and the common TA share one UL synchronization validity timer.

In an example, the ephemeris information and the common TA are carried in different system messages, the ephemeris information corresponds to one UL synchronization validity timer, and the common TA corresponds to another UL synchronization validity timer.

In some possible implementations, the TA pre-compensation reference information includes the ephemeris information. The UE 101 may determine the position of the satellite 103 according to the ephemeris information, to calculate the RRT between the UE 101 and the satellite 103.

In some possible implementations, the TA pre-compensation reference information includes the common TA.

According to embodiments of the disclosure, when the TA pre-compensation reference information becomes invalid, the UE 101 may proactively acquire the system message carrying the TA pre-compensation reference information from the first network device 102. This enables the UE 101 to reacquire current valid TA pre-compensation reference information, facilitating the execution of the TA pre-compensation and ensuring the UL synchronization. Moreover, the UE 101 is not limited to proactively acquiring the system message via initiating the RLF procedure; it may also acquire the system message by initiating the non-RLF procedure. Thus, the UE in the connected state may acquire the TA pre-compensation reference information through the system message, regardless of whether it utilizes the RLF or non-RLF procedures.

According to embodiments of the disclosure, a method for UL synchronization is provided. The method is performed by the UE 101. The method includes following steps.

At step S601-1, the UE 101, in response to the expiration of the UL synchronization validity timer related to the TA pre-compensation reference information, determines that the TA pre-compensation reference information is invalid. When a preset system message is invalid, the UE 101 initiates the RLF procedure or the non-RLF procedure to acquire the system message carrying the TA pre-compensation reference information. The TA pre-compensation reference information includes at least one of the ephemeris information or the common TA. The preset system message includes a system message carrying the TA pre-compensation reference information.

In some possible implementations, the preset system message includes the system message carrying the TA pre-compensation reference information.

In some possible implementations, the preset system message includes an SIB1 and the system message carrying the TA pre-compensation reference information.

In some possible implementations, the preset system message includes an MIB, an SIB1, and the system message carrying the TA pre-compensation reference information.

In some possible implementations, when the preset system message currently stored is invalid, the UE 101 may acquire a latest preset system message.

In some possible implementations, the UE 101 only needs to acquire the system message carrying the TA pre-compensation reference information, and only needs to ensure the validity of this system message.

In an example, the system message carrying the TA pre-compensation reference information may be one of an MIB, an SIB1, an SIB2, or an SIB-22-NB of an NB-IoT terminal.

In some possible implementations, step S701 further includes: not necessary to ensure that the system message not carrying the TA pre-compensation reference information is valid.

In an example, when the ephemeris information and the common TA are not carried in the MIB, the SIB1, the SIB2, or the SIB-22-NB of the NB-IoT terminal, it's not necessary to ensure that the MIB, the SIB1, the SIB2, or the SIB-22-NB of the NB-IoT terminal is valid.

According to embodiments of the disclosure, the preset system message is configured. In a scenario where the UL synchronization validity timer expires, when the preset system message is invalid, the RLF procedure or the non-RLF procedure is initiated to acquire the system message carrying the TA pre-compensation reference information.

According to embodiments of the disclosure, a method for UL synchronization is provided. The method is performed by the UE 101. In the method, the preset system message includes the system message carrying the TA pre-compensation reference information. The method includes following steps.

At step S701, it is determined that the TA pre-compensation reference information is invalid in response to the expiration of the UL synchronization validity timer related to the TA pre-compensation reference information.

At step S702, when the system information carrying the TA pre-compensation reference information is invalid, the RLF procedure or the non-RLF procedure is initiated to acquire the system message carrying the TA pre-compensation reference information. The TA pre-compensation reference information includes at least one of the ephemeris information or the common TA.

In an example, the system message carrying the TA pre-compensation reference information may be one of an MIB, an SIB1, an SIB2, or an SIB-22-NB of an NB-IoT terminal.

In some possible implementations, step S701 further includes: not necessary to ensure that the system message not carrying the TA pre-compensation reference information is valid.

In an example, when the ephemeris information and the common TA are not carried in the MIB, the SIB1, the SIB2, or the SIB-22-NB of the NB-IoT terminal, it's not necessary to ensure that the MIB, the SIB1, the SIB2, or the SIB-22-NB of the NB-IoT terminal is valid.

According to embodiments of the disclosure, the UE 101 needs to ensure the validity of the system message carrying the TA pre-compensation reference information. For the system message not carrying the TA pre-compensation reference information, the UE 101 does not need to ensure or maintain the validity of the system message.

According to embodiments of the disclosure, a method for UL synchronization is provided. The method is performed by the UE 101. In the method, the preset system message includes the system message carrying the TA pre-compensation reference information. The method includes following steps.

At step S701, it is determined that the TA pre-compensation reference information is invalid in response to the expiration of the UL synchronization validity timer related to the TA pre-compensation reference information.

At step S703, the MIB or the SIB1 is invalid, and the system message carrying the TA pre-compensation reference information is acquired based on the MIB or the SIB1. When the system message carrying the TA pre-compensation reference information is invalid, the RLF procedure or the non-RLF procedure is initiated based on the MIB or the SIB1. The system message carrying the TA pre-compensation reference information is acquired. The TA pre-compensation reference information includes at least one of the ephemeris information or the common TA.

In some possible implementations, when the MIB or the SIB1 is invalid, the UE 101 attempts to acquire an SIB carrying the TA pre-compensation reference information based on the invalid MIB or SIB1.

In some possible implementations, when the UE 101 fails to attempt to acquire the SIB carrying the TA pre-compensation reference information based on the invalid MIB or SIB1, the SIB carrying the TA pre-compensation reference information may be re-acquired after the MIB or SIB1 is re-acquired.

According to embodiments of the disclosure, the UE 101 may acquire the SIB carrying the TA pre-compensation reference information according to the invalid MIB or SIB1.

According to embodiments of the disclosure, a method for UL synchronization is provided. The method is performed by the UE 101. In the method, the preset system message includes the MIB, the SIB1, or the system message carrying the TA pre-compensation reference information. The method includes following steps.

At step S801, it is determined that the TA pre-compensation reference information is invalid in response to the expiration of the UL synchronization validity timer related to the TA pre-compensation reference information.

At step S802, when any one of the MIB, the SIB1, or the system information carrying the TA pre-compensation reference information is invalid, the RLF procedure or the non-RLF procedure is initiated to acquire the system message carrying the TA pre-compensation reference information. The TA pre-compensation reference information includes at least one of the ephemeris information or the common TA.

In some possible implementations, the preset system message includes an MIB, an SIB1, and the system message carrying the TA pre-compensation reference information.

In some possible implementations, the ephemeris information and the common TA are not carried in the MIB and the SIB1.

In some possible implementations, when the ephemeris information and the common TA are not carried in the SIB2 and the SIB-22-NB of the NB-IoT terminal, the validity of the SIB2 and the SIB-22-NB is not ensured.

According to embodiments of the disclosure, a method for UL synchronization is provided. The method is performed by the UE 101. In the method, the preset system message includes the SIB1 and the system message carrying the TA pre-compensation reference information. The method includes following steps.

At step S901, it is determined that the TA pre-compensation reference information is invalid in response to the expiration of the UL synchronization validity timer related to the TA pre-compensation reference information.

At step S902, when the SIB1 or the system message carrying the TA pre-compensation reference information is invalid, the RLF procedure or the non-RLF procedure is initiated to acquire the system message carrying the TA pre-compensation reference information. The TA pre-compensation reference information includes at least one of the ephemeris information or the common TA.

In some possible implementations, the preset system message includes the SIB1 and the system message carrying the TA pre-compensation reference information.

In some possible implementations, the ephemeris information and the common TA are not carried in the SIB1.

In some possible implementations, when the ephemeris information and the common TA are not carried in the MIB, the SIB2, or the SIB-22-NB of the NB-IoT terminal, the validity of the SIB2 and the SIB-22-NB is not ensured.

According to embodiments of the disclosure, a method for UL synchronization is provided. The method is performed by the UE 101. The method includes following steps.

At step S600, it is determined whether or not it is capable of acquiring the system message carrying the TA pre-compensation reference information.

At step S601-1, the UE 101, in response to an expiration of a UL synchronization validity timer related to TA pre-compensation reference information, determines that the TA pre-compensation reference information is invalid, and initiates an RLF procedure or a non-RLF procedure to acquire a system message carrying the TA pre-compensation reference information. The TA pre-compensation reference information includes at least one of ephemeris information or a common TA.

According to embodiments of the disclosure, the UE 101 may detect whether the UE itself is capable of acquiring the system message carrying the ephemeris information or the common TA.

According to embodiments of the disclosure, a method for UL synchronization is provided. The method is performed by the UE 101. The method includes following steps.

At step S600-1, it is determined whether or not it is capable of acquiring the preset system message based on an implementation procedure of the UE.

At step S601-1, the UE 101 determines that the TA pre-compensation reference information is invalid in response to the expiration of the UL synchronization validity timer related to the TA pre-compensation reference information. When the TA pre-compensation reference information is invalid, the RLF procedure or the non-RLF procedure is initiated to acquire the system message carrying the TA pre-compensation reference information. The TA pre-compensation reference information includes at least one of the ephemeris information or the common TA.

According to embodiments of the disclosure, a method for UL synchronization is provided. The method is performed by the UE 101. The method includes following steps.

At step S600-2, it is determined that it is not capable of acquiring the system message carrying the TA pre-compensation reference information in response to that the system message carrying the TA pre-compensation reference information is not acquired within a set duration after the UL synchronization validity timer expires.

At step S601-1, the UE 101 determines that the TA pre-compensation reference information is invalid in response to the expiration of the UL synchronization validity timer related to the TA pre-compensation reference information. When the TA pre-compensation reference information is invalid, the RLF procedure or the non-RLF procedure is initiated to acquire the system message carrying the TA pre-compensation reference information. The TA pre-compensation reference information includes at least one of the ephemeris information or the common TA.

In some possible implementations, after the UL synchronization validity timer expires, a timer is started to monitor whether the expiration of the UL synchronization validity timer reaches the set duration.

In some possible implementations, when the timer monitors that the expiration of the UL synchronization validity timer does not reach the set duration, the UE acquires the system message carrying the TA pre-comprehension reference information, and the timer stops or is reset.

According to embodiments of the disclosure, a method for UL synchronization is provided. The method is performed by the UE 101. The method includes following steps.

At step S600-2, it is determined that it is not capable of acquiring the preset system message in response to that the system message carrying the pre-compensation reference information is not acquired within a set duration after the UL synchronization validity timer expires.

At step S600-3, in response to being not capable of acquiring the preset system message, a connection reestablishment is initiated, or an idle state is returned after a procedure of leaving a connected state is executed.

At step S601-1, the UE 101, in response to the expiration of the UL synchronization validity timer related to the TA pre-compensation reference information, determines that the TA pre-compensation reference information is invalid, and initiates the RLF procedure or the non-RLF procedure to acquire the system message carrying the TA pre-compensation reference information. The TA pre-compensation reference information includes at least one of the ephemeris information or the common TA.

In some possible implementations, after the UE returns to the idle state, a release cause is set to the system message acquisition failure.

According to embodiments of the disclosure, a method for UL synchronization is provided. The method is performed by the UE 101. The method includes following steps.

At step S1001, after the UL synchronization validity timer expires, a radio resource control (RRC) layer notifies a media access control (MAC) layer, to cause the UE to stop performing a UL transmission.

At step S601, the UE 101, in response to the expiration of the UL synchronization validity timer related to the TA pre-compensation reference information, determines that the TA pre-compensation reference information is invalid, and initiates the RLF procedure or the non-RLF procedure to acquire the system message carrying the TA pre-compensation reference information. The TA pre-compensation reference information includes at least one of the ephemeris information or the common TA.

In some possible implementations, after the UL synchronization validity timer expires, UL out-of-synchronization is caused. When the UL out-of-synchronization occurs, the UE 101 may not perform a UL data transmission. A UL data transmission behavior includes at least one of: a random access, a UL scheduling request (SR), a UL transmission of a configured grant, or a hybrid automatic repeat request (HARQ) feedback.

In some possible implementations, the UE 101 may not initiate the random access before acquiring the latest ephemeris information or common TA.

In some possible implementations, after an MAC layer acquires that the UL synchronization validity timer expires, a processing procedure after the UL synchronization validity timer expires may be executed.

In some possible implementations, the UL synchronization validity timer expires means all UL synchronization validity timers expire.

In an example, a UL synchronization validity timer corresponding to a primary timing advance group (pTAG) expires.

In an example, UL synchronization validity timers corresponding to the pTAG and a secondary timing advance group (sTAG) expire.

According to embodiments of the disclosure, a method for UL synchronization is provided. The method is performed by the UE 101. The method includes following steps.

At step S1002, after the UL synchronization validity timer expires, an RRC layer notifies a physical (PHY) layer, to cause the PHY layer not to perform any UL transmission.

At step S601, the UE 101, in response to the expiration of the UL synchronization validity timer related to the TA pre-compensation reference information, determines that the TA pre-compensation reference information is invalid, and initiates the RLF procedure or the non-RLF procedure to acquire the system message carrying the TA pre-compensation reference information. The TA pre-compensation reference information includes at least one of the ephemeris information or the common TA.

In some possible implementations, after the PHY layer acquires that the UL synchronization validity timer expires, any UL transmission is temporarily disabled.

In some possible implementations, the UE may re-initiate the random access after acquiring the latest ephemeris information or common TA. The PHY layer may allow the re-initiated random access.

According to embodiments of the disclosure, a method for UL synchronization is provided. The method is performed by the UE 101. The method includes following steps.

At step S1003, after the UL synchronization validity timer expires, an RRC layer transmits notification information for indicating the expiration of the UL synchronization validity timer to an MAC layer, to cause the MAC layer not to perform any UL transmission other than a random access. The random access is a random access in response to acquiring the latest TA pre-compensation reference information.

At step S601, the UE 101, in response to the expiration of the UL synchronization validity timer related to the TA pre-compensation reference information, determines that the TA pre-compensation reference information is invalid, and initiates the RLF procedure or the non-RLF procedure to acquire the system message carrying the TA pre-compensation reference information. The TA pre-compensation reference information includes at least one of the ephemeris information or the common TA.

In some possible implementations, the UE 101 may re-initiate the random access after acquiring the latest ephemeris information or common TA.

According to embodiments of the disclosure, a method for UL synchronization is provided. The method is performed by the UE 101. The method includes following steps.

At step S1101, after the UL synchronization validity timer expires, at an RRC layer, it performs at least one of:

- releasing or disabling all physical uplink control channels (PUCCHs) or all short physical uplink control channels (SPUCCHs) of a serving cell;
- releasing or disabling all semi-persistent scheduling (SPS) of a serving cell; or
- releasing or disabling dedicated scheduling request (SR) resources of an NB-IoT.

At step S601, the UE 101, in response to the expiration of the UL synchronization validity timer related to the TA pre-compensation reference information, determines that the TA pre-compensation reference information is invalid, and initiates the RLF procedure or the non-RLF procedure to acquire the system message carrying the TA pre-compensation reference information. The TA pre-compensation reference information includes at least one of the ephemeris information or the common TA.

According to embodiments of the disclosure, after the UL synchronization validity timer expires, an operation that may be performed at the RRC layer is disclosed.

According to embodiments of the disclosure, a method for UL synchronization is provided. The method is performed by the UE 101. The method includes following steps.

At step S1101, after the UL synchronization validity timer expires, at an RRC layer, it performs at least one of:

- releasing or disabling all PUCCHs or all SPUCCHs of a serving cell;
- releasing or disabling all SPS of a serving cell; or
- releasing or disabling all dedicated SR resources of an NB-IoT.

At step S601, the UE 101, in response to the expiration of the UL synchronization validity timer related to the TA pre-compensation reference information, determines that the TA pre-compensation reference information is invalid, and initiates the RLF procedure or the non-RLF procedure to acquire the system message carrying the TA pre-compensation reference information. The TA pre-compensation reference information includes at least one of the ephemeris information or the common TA.

At step S1102, after latest TA pre-compensation reference information is acquired, in response to receiving an indication of an MAC layer that the common TA from a base station is acquired, at an RRC layer, it performs at least one of:

- recovering all disabled PUCCHs or all disabled SPUCCHs of a serving cell;
- recovering all disabled SPS of a serving cell; or
- recovering all disabled dedicated SR resources of an NB-IoT.

According to embodiments of the disclosure, after the UL synchronization validity timer expires and acquires new TA pre-comprehension reference information, an operation that may be performed at the RRC layer is disclosed.

According to embodiments of the disclosure, a method for UL synchronization is provided. The method is performed by the UE 101. The method includes following steps.

At step S1201, after the UL synchronization validity timer expires, in response to an MAC layer receiving notification information for indicating the expiration of the UL synchronization validity timer from an RRC layer, it performs at least one of:

- clearing all HARQ cache of a serving cell;
- clearing or disabling all configured DL configurations and UL grants;
- initiating a random access;
- disabling any UL transmission; or
- disabling any UL transmission other than a random access.

At step S601, the UE 101, in response to the expiration of the UL synchronization validity timer related to the TA pre-compensation reference information, determines that the TA pre-compensation reference information is invalid, and initiates the RLF procedure or the non-RLF procedure to acquire the system message carrying the TA pre-compensation reference information. The TA pre-compensation reference information includes at least one of the ephemeris information or the common TA.

At S1202, after latest TA pre-compensation reference information is acquired, the MAC layer may further perform one of:

- notifying the RRC layer after acquiring the common TA; or
- recovering disabled configured DL configurations and UL grants after acquiring the common TA.

According to embodiments of the disclosure, after the UL synchronization validity timer expires and the latest TA pre-comprehension reference information is acquired, an operation that may be performed at the MAC layer is disclosed.

In some possible implementations, the random access initiated by the MAC layer may be directly starting the random access, or performing the random access when the UE 101 transmits UL data.

According to embodiments of the disclosure, a method for UL synchronization is provided. The method is performed by the UE 101. The method includes following steps.

At step S601, the UE 101, in response to the expiration of the UL synchronization validity timer related to the TA pre-compensation reference information, determines that the TA pre-compensation reference information is invalid, and initiates the RLF procedure or the non-RLF procedure to acquire the system message carrying the TA pre-compensation reference information. The TA pre-compensation reference information includes at least one of the ephemeris information or the common TA.

At S1301, information related the expiration of the UL synchronization validity timer is transmitted to a network device. The information related the expiration includes at least one of:

- a system frame number (SFN), a hyper frame number (HFN), or a subframe number when the UL synchronization validity timer expires;
- a corresponding time when the UL synchronization validity timer expires; or
- a remaining duration of the UL synchronization validity timer from the expiration.

In some possible implementations, the time when the UL synchronization validity timer expires includes an epoch time or a universal time coordinated (UTC).

In some possible implementations, units of the remaining duration of the UL synchronization validity timer from the expiration include the SFN or the HFN, the epoch time or the UTC.

According to embodiments of the disclosure, the UE 101 may report the information related the expiration of the UL synchronization validity timer to the first network device 102 at an appropriate occasion, so that the first network device 102 knows when the UL synchronization validity timer expires, to make preparation in advance in a target manner. For example, the first network device 102 may not schedule the UE after expiration for a period of occasions.

According to embodiments of the disclosure, a method for UL synchronization is provided. The method is performed by the UE 101. The method includes following steps.

At step S601, the UE 101, in response to the expiration of the UL synchronization validity timer related to the TA pre-compensation reference information, determines that the TA pre-compensation reference information is invalid, and initiates the RLF procedure or the non-RLF procedure to acquire the system message carrying the TA pre-compensation reference information. The TA pre-compensation reference information includes at least one of the ephemeris information or the common TA.

At S1401, the UE 101 returns to an idle state after executing a procedure of leaving a connected state.

According to embodiments of the disclosure, a method for UL synchronization is provided. The method is performed by the UE 101. The method includes following steps.

At step S601, the UE 101, in response to the expiration of the UL synchronization validity timer related to the TA pre-compensation reference information, determines that the TA pre-compensation reference information is invalid, and initiates the RLF procedure or the non-RLF procedure to acquire the system message carrying the TA pre-compensation reference information. The TA pre-compensation reference information includes at least one of the ephemeris information or the common TA.

At step S1501, after the RLF procedure is initiated, it performs at least one of:

- not initiating a connection establishment;
- not recording an RLF related report (RLF report);
- maintaining a connected state when an access stratum (AS) is not activated;

triggering and acquiring an SIB; or triggering a random access after acquiring the SIB.

In some possible implementations, after the UL synchronization validity timer expires, the UE may declare the RLF, and may perform the RLF enhancement operation at step S1501.

According to embodiments of the disclosure, a method for UL synchronization is provided. The method is performed by the first network device 102. The method includes following steps.

At step S1601, in response to a UE initiating an RLF procedure or a non-RLF procedure, the first network device 102 transmits a system message carrying TA pre-compensation reference information to the UE. The TA pre-compensation reference information includes at least one of ephemeris information or a common TA. The UE is configured to initiate the RLF procedure or the non-RLF procedure when determining the TA pre-compensation reference information is invalid in response to an expiration of the UL synchronization validity timer related to the TA pre-compensation reference information.

By adopting the method, the first network device 102 may transmit the system message carrying the TA pre-compensation reference information to the UE at a suitable moment, allowing the UE to perform the TA pre-compensation using the re-acquired TA pre-compensation reference information, thereby maintaining the UL synchronization.

According to embodiments of the disclosure, a method for UL synchronization is provided. The method is performed by the first network device 102. The method includes following steps.

At step S1601, in response to a UE initiating an RLF procedure or a non-RLF procedure, the first network device 102 transmits a system message carrying TA pre-compensation reference information to the UE. The TA pre-compensation reference information includes at least one of ephemeris information or a common TA. The UE is configured to initiate the RLF procedure or the non-RLF procedure when determining the TA pre-compensation reference information is invalid in response to an expiration of the UL synchronization validity timer related to the TA pre-compensation reference information.

At step S1602, the first network device 102 receives information related the expiration of the UL synchronization validity timer from the UE from the UE 101. The information related the expiration includes at least one of:

- a system frame number, a hyper frame number, or a subframe number when the UL synchronization validity timer expires;
- a corresponding time when the UL synchronization validity timer expires; or
- a remaining duration of the UL synchronization validity timer from the expiration.

Based on the same conception as the above method embodiments, a communication apparatus is further presented according to embodiments of the disclosure. The communication apparatus may have functions of the UE 101 according to the above embodiments and may be configured to perform steps executed by the UE 101 according to the above embodiments. The functions may be implemented by hardware, or by software, or by software executed on hardware. The software or the hardware includes one or more modules corresponding to the above functions.

Figure 7:
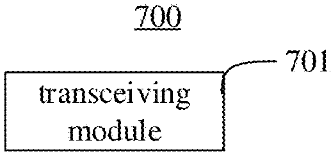
FIG. 7 is a diagram illustrating an apparatus for UL synchronization according to some embodiments.

In a possible implementation, a communication apparatus 700 as illustrated in FIG. 7 may be taken as the UE 101 according to the above method embodiments, and perform steps executed by the UE 101 according to the above method embodiments. As illustrated in FIG. 7, the communication apparatus 700 may include a transceiving module 701. The transceiving module 701 may be configured to support the communication apparatus 700 to perform the communication. The transceiving module 701 may have a wireless communication function, for example, perform a wireless communication with other communication apparatuses via a radio interface.

When steps implemented by the UE 101 are executed, the transceiving module 701 is configured to, in response to an expiration of a UL synchronization validity timer related to TA pre-compensation reference information, determine that the TA pre-compensation reference information is invalid, and initiate an RLF procedure or a non-RLF procedure to acquire a system message carrying the TA pre-compensation reference information. The TA pre-compensation reference information includes at least one of ephemeris information or a common TA.

Figure 8:
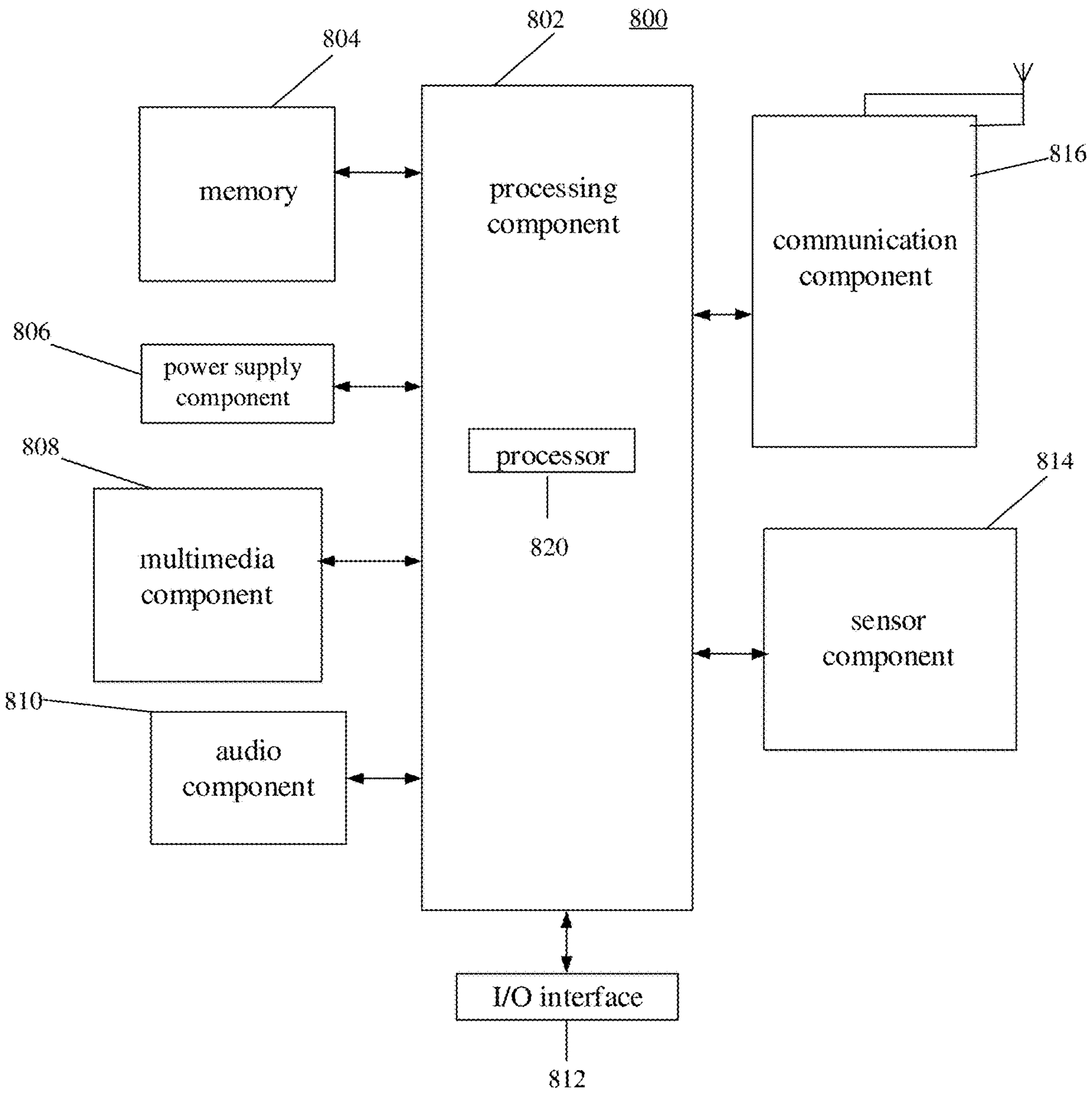
FIG. 8 is a diagram illustrating another apparatus for UL synchronization according to some embodiments.

When the communication apparatus is the UE 101, a structure of the communication apparatus may be as illustrated in FIG. 8. A communication apparatus 800 may be a mobile phone, a computer, a digital broadcasting terminal, a messaging device, a game console, a tablet device, a medical equipment, a fitness equipment, a personal digital assistant, etc.

Referring to FIG. 8, the apparatus 800 may include one or more components: a processing component 802, a memory 804, a power supply component 806, a multimedia component 808, an audio component 810, an input/output (I/O) interface 812, a sensor component 814, and a communication component 816.

The processing component 802 generally controls the whole operation of the apparatus 800, such as operations related to display, phone call, data communication, camera operation, and recording operation. The processing component 802 may include one or more processors 820 to perform instructions, to complete all or part of steps of the above methods. In addition, the processing component 802 may include one or more modules for the convenience of interaction between the processing component 802 and other components. For example, the processing unit 802 may include a multimedia module for the convenience of interaction between the multimedia component 808 and the processing component 802.

The memory 804 is configured to store all types of data to support the operation of the apparatus 800. Examples of the data include the instructions of any applications or methods operated on the apparatus 800, contact data, phone book data, messages, pictures, videos, etc. The memory 804 may be implemented by any type of volatile or non-volatile storage devices or their combination, such as a static random access memory (SRAM), an electrically erasable programmable read-only memory (EEPROM), an erasable programmable read-only (EPROM), a programmable read-only memory (PROM), a read-only memory (ROM), a magnetic memory, a flash memory, a magnetic disk, or an optical disk.

The power supply component 806 may provide power supply for all components of the apparatus 800. The power supply component 806 may include power supply management system, one or more power supplies, and other units related to generating, managing and distributing power for the apparatus 800.

The multimedia component 808 includes an output interface screen provided between the apparatus 800 and the user. In some embodiments, a screen may include a liquid crystal display (LCD) and a touch panel (TP). When the screen includes a touch panel, the screen may be implemented as a touch screen to receive input signals from the user. The touch panel includes one or more touch sensors to sense touch, slide and gestures on the touch panel. The touch sensor may not only sense a boundary of a touch or slide action, but also detect a duration and pressure related to the touch or slide operation. In some embodiments, the multimedia component 808 includes a front camera and/or a rear camera. When the apparatus 800 is in operation mode, such as shooting mode or video mode, the front camera and/or the rear camera may receive external multimedia data. Every front camera and rear camera may be a fixed optical lens system or an optical lens system with focal length and optical zoom capacity.

The audio component 810 is configured as an output and/or input signal. For example, the audio component 810 includes a microphone (MIC). When the apparatus 800 is in operation mode, such as call mode, record mode, and speech recognition mode, the microphone is configured to receive the external audio signals. The audio signals received may be further stored in the memory 804 or sent via the communication units 816. In some embodiments, the audio component 810 further includes a speaker configured to output an audio signal.

The I/O interface 812 provides an interface for the processing component 802 and the peripheral interface module, and the peripheral interface module may be a keyboard, a click wheel, a button, etc. The buttons may include but not limited to a home button, a volume button, a start button and a lock button.

The sensor component 814 includes one or more sensors, configured to provide various aspects of status assessment for the apparatus 800. For example, the sensor component 814 may detect the on/off state of the apparatus 800 and the relative positioning of the component. For example, the component is a display and a keypad of the apparatus 800. The sensor component 814 may further detect the location change of the apparatus 800 or one component of the apparatus 800, the presence or absence of contact between the user and the device 800, the orientation or acceleration/deceleration of the apparatus 800, and the temperature change of the apparatus 800. The sensor component 814 may include a proximity sensor, which is configured to detect presence of the objects nearby without any physical contact. The sensor component 814 may further include a light sensor such as a CMOS or CCD image sensor, which is configured to use in imaging applications. In some embodiments, the sensor component 814 may further include an acceleration transducer, a gyroscope sensor, a magnetic sensor, a pressure sensor or a temperature sensor.

The communication component 816 is configured for the convenience of wire or wireless communication between the apparatus 800 and other devices. The apparatus 800 may access wireless networks based on communication standard, such as Wi-Fi™, 4G, 5G, or their combination. In some embodiments, the communication component 816 receives broadcast signals or broadcast-related information from an external broadcast management system 816 via a broadcast channel. In some embodiments, the communication component 816 further includes a near field communication (NFC) module to facilitate short-range communication. For example, the NFC module may be implemented based on a radio frequency identification (RFID) technology, an infrared data association (IRDA) technology, an ultra-wideband (UWB) technology, Bluetooth™ (BT) technology and other technologies.

In some embodiments, the apparatus 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

Based on the same conception as the above method embodiments, a communication apparatus is further presented according to embodiments of the disclosure. The communication apparatus may have functions of the first network device 102 according to the above method embodiments and may be configured to perform steps executed by the first network device 102 according to the above method embodiments. The functions may be implemented by hardware, or by software, or by software executed on hardware. The software or the hardware includes one or more modules corresponding to the above functions.

Figure 9:
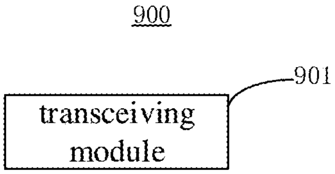
FIG. 9 is a diagram illustrating another apparatus for UL synchronization according to some embodiments.

In a possible implementation, a communication apparatus 900 as illustrated in FIG. 9 may be taken as the first network device 102 according to the above method embodiments, and perform steps executed by the first network device 102 according to the above method embodiments. As illustrated in FIG. 9, the communication apparatus 900 may include a transceiving module 901. The transceiving module 901 may be configured to support the communication apparatus 900 to perform the communication. The transceiving module 901 may have a wireless communication function, for example, perform a wireless communication with other communication apparatuses via a radio interface.

When steps implemented by the first network device 102 are executed, the transceiving module 901 is configured to, in response to a UE initiating an RLF procedure or a non-RLF procedure, transmit a system message carrying TA pre-compensation reference information to the UE. The TA pre-compensation reference information includes at least one of ephemeris information or a common TA. The UE is configured to initiate the RLF procedure or the non-RLF procedure when determining the TA pre-compensation reference information is invalid in response to an expiration of the UL synchronization validity timer related to the TA pre-compensation reference information.

Figure 10:
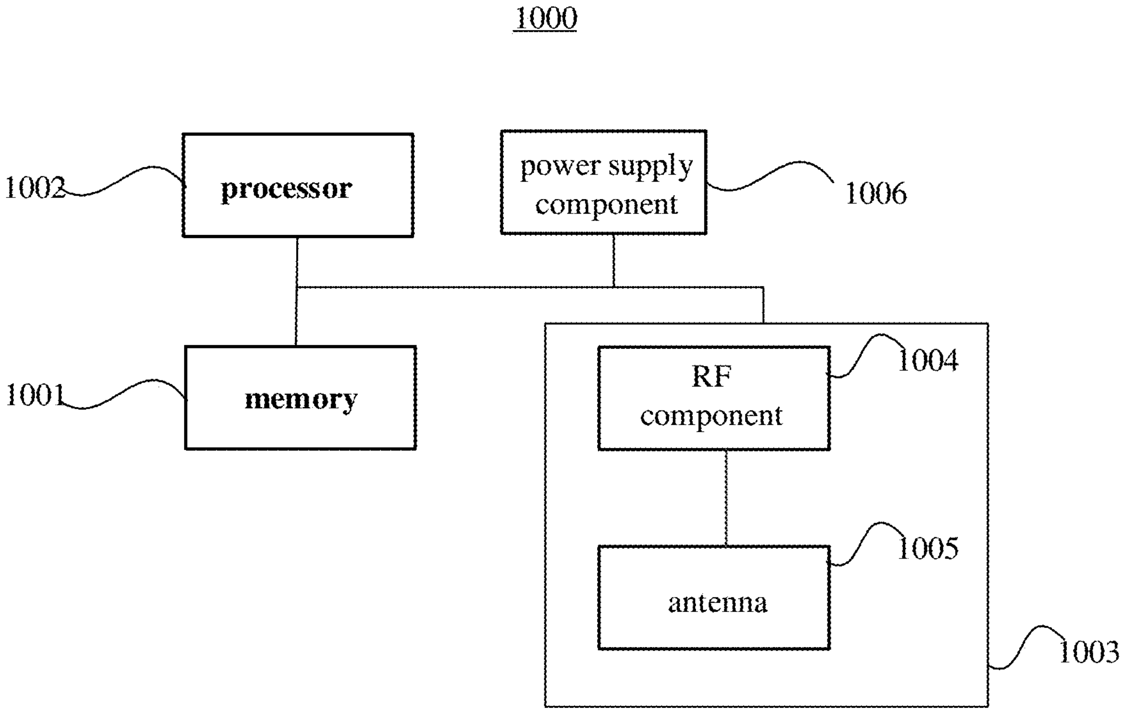
FIG. 10 is a diagram illustrating a device for UL synchronization according to some embodiments.

When the communication apparatus is the first network device 102, a structure of the communication apparatus may be as illustrated in FIG. 10. As illustrated in FIG. 10, a device 1000 includes a memory 1001, a processor 1002, a transceiving component 1003, and a power supply component 1006. The memory 1001 is coupled to the processor 1002, and may be configured to store a program and data necessary for achieving functions of the communication device 1000. The processor 1002 is configured to support the communication device 1000 to execute corresponding functions in the above methods, and the above functions may be achieved by calling a program stored in the memory 1001. The transceiving component 1003 may be a wireless transceiver, and may be configured to support the communication device 1000 to receive a signaling and/or data and transmit the signaling and/or the data via a wireless air interface. The transceiving component 1003 may be referred to as a transceiving unit or a communication unit. The transceiving component 1003 may include a radio frequency (RF) component 1004 and one or more antennas 1005. The RF component may be a remote radio unit (RRU), and may be configured for transmission of an RF signal and conversion between the RF signal and a baseband signal. The one or more antennas 1005 may be configured for radiating and receiving the RF signal.

When the communication device 1000 needs to transmit data, the processor 1002 may output a baseband signal to an RF unit after performing a baseband processing on data to be transmitted, and the RF unit may transmit the RF signal in the form of electromagnetic waves via an antenna after performing an RF processing on the baseband signal. When data are transmitted to the communication device 1000, the RF unit converts the RF signal into a baseband signal after receiving the RF signal via the antenna, and outputs the baseband signal to the processor 1002, and the processor 1002 converts the baseband signal to data and processes the data.

After considering the specification and practicing the disclosure herein, those skilled in the art will easily think of other implementations of embodiments of the disclosure. The present application is intended to cover any variations, usages, or adaptive changes of embodiments of the disclosure. These variations, usages or adaptive changes of embodiments of the disclosure follow the general principles of the disclosure and include common knowledge or conventional technical means in the technical field not disclosed by the disclosure. The description and the embodiments are to be regarded as exemplary only, and the true scope of embodiments in the disclosure are given by the appended claims.

It should be understood that embodiments of the disclosure are not limited to the precise structure described above and illustrated in the drawings, and various modifications and changes may be made without departing from its scope. The scope of the present application is only limited by the appended claims. The scope of embodiments of the disclosure is only limited by the appended claims.

INDUSTRIAL APPLICABILITY

The UE can proactively acquire the system message carrying the TA pre-compensation reference information when the TA pre-compensation reference information is invalid, so that current valid TA pre-compensation reference information may be re-acquired, to facilitate to perform the TA pre-compensation, and ensure the UL synchronization. Furthermore, the UE may proactively acquire the system message by initiating the RLF procedure or may acquire the system message by initiating the non-RLF procedure, so that the UE in the connected state may acquire the TA pre-comprehension reference information by acquiring the system message.

According to a first aspect of embodiments of the disclosure, a method for UL synchronization is provided. The method is performed by a UE. The method includes: in response to an expiration of a UL synchronization validity timer related to TA pre-compensation reference information, determining that the TA pre-compensation reference information is invalid, and initiating a radio link failure (RLF) procedure or a non-RLF procedure to acquire a system message carrying the TA pre-compensation reference information; in which the TA pre-compensation reference information includes at least one of ephemeris information or a common TA.

By adopting the method, the UE may proactively acquire the system message carrying the TA pre-compensation reference information when the existing TA pre-compensation reference information is invalid, thereby re-acquiring current valid TA pre-compensation reference information to facilitate to perform a TA pre-compensation and ensure the UL synchronization. Furthermore, the UE is not limited to initiating the RLF procedure for proactively acquiring the system message; it may also initiate the non-RLF procedure to acquire the system message. This enables the UE in the connected state to acquire the TA pre-compensation reference information by acquiring the system message.

In a possible implementation, initiating the RLF procedure or the non-RLF procedure to acquire the system message carrying the TA pre-compensation reference information includes: when a preset system message is invalid, initiating the RLF procedure or the non-RLF procedure to acquire the system message carrying the TA pre-compensation reference information; in which the preset system message includes a system message carrying the TA pre-compensation reference information.

In a possible implementation, the method further includes: determining whether or not it is capable of acquiring the system message carrying the TA pre-compensation reference information.

In a possible implementation, determining whether or not it is capable of acquiring the system message carrying the TA pre-compensation reference information includes: determining whether or not it is capable of acquiring the preset system message based on an implementation procedure of the UE.

In a possible implementation, determining whether or not it is capable of acquiring the system message carrying the TA pre-compensation reference information includes: determining that it is not capable of acquiring the system message carrying the TA pre-compensation reference information in response to that the system message carrying the TA pre-compensation reference information is not acquired within a set duration after the UL synchronization validity timer expires.

In a possible implementation, the method further includes: in response to being not capable of acquiring the preset system message, initiating a connection reestablishment, or returning to an idle state after executing a procedure of leaving a connected state.

In a possible implementation, the method further includes: after the UL synchronization validity timer expires, notifying, by a radio resource control (RRC) layer, a media access control (MAC) layer, to cause the UE to stop performing a UL transmission.

In a possible implementation, the method further includes: after the UL synchronization validity timer expires notifying, by an RRC layer, a physical (PHY) layer, to cause the PHY layer not to perform any UL transmission.

In a possible implementation, the method further includes: after the UL synchronization validity timer expires, transmitting, by an RRC layer, notification information for indicating the expiration of the UL synchronization validity timer, to an MAC layer, to cause the MAC layer not to perform any UL transmission other than a random access, in which the random access is a random access in response to acquiring latest TA pre-compensation reference information.

In a possible implementation, the method further includes: after the UL synchronization validity timer expires, at an RRC layer, performing at least one of: releasing or disabling all physical uplink control channels (PUCCHs) or all short physical uplink control channels (SPUCCHs) of a serving cell; releasing or disabling all semi-persistent scheduling (SPS) of a serving cell; or releasing or disabling dedicated scheduling request (SR) resources of a narrow band Internet of Things (NB-IoT).

In a possible implementation, the method further includes: after acquiring latest TA pre-compensation reference information, in response to receiving an indication of an MAC layer that the common TA from a base station is acquired, at an RRC layer, performing at least one of:

recovering all disabled PUCCHs or all disabled SPUCCHs of a serving cell; recovering all disabled SPS of a serving cell; or recovering all disabled SR resources of an NB-IoTs.

In a possible implementation, the method further includes: after the UL synchronization validity timer expires, in response to an MAC layer receiving notification information for indicating the expiration of the UL synchronization validity timer from an RRC layer, performing at least one of: clearing all hybrid automatic repeat request (HARQ) cache of a serving cell; clearing or disabling all configured DL configurations and UL grants; initiating a random access; disabling any UL transmission; disabling any UL transmission other than a random access; notifying the RRC layer after acquiring the common TA; or recovering disabled configured DL configurations and UL grants after acquiring the common TA.

In a possible implementation, the method further includes: transmitting information related the expiration of the UL synchronization validity timer to a network device, in which the information related the expiration includes at least one of: a system frame number, a hyper frame number or a subframe number when the UL synchronization validity timer expires; a corresponding time when the UL synchronization validity timer expires; or a remaining duration of the UL synchronization validity timer from the expiration.

In a possible implementation, the method further includes: returning to an idle state after the UE executes a procedure of leaving a connected state.

In a possible implementation, the method further includes: after initiating the RLF procedure, performing at least one of: not initiating a connection establishment; not recording an RLF related report; maintaining a connected state when an access stratum (AS) is not activated; triggering and acquiring a system information block (SIB); or triggering a random access after acquiring an SIB.

According to a second aspect of embodiments of the disclosure, a method for UL synchronization is provided. The method is performed by a first network device. The method includes: in response to a UE initiating an RLF procedure or a non-RLF procedure, transmitting a system message carrying TA pre-compensation reference information to the UE; in which the TA pre-compensation reference information includes at least one of ephemeris information or a common TA, and the UE is configured to initiate the RLF procedure or the non-RLF procedure when determining the TA pre-compensation reference information is invalid in response to an expiration of the UL synchronization validity timer related to the TA pre-compensation reference information.

By adopting the method, the first network device may transmit the system message carrying the TA pre-compensation reference information to the UE at a suitable moment, allowing the UE to perform the TA pre-compensation using the re-acquired TA pre-compensation reference information, thereby maintaining the UL synchronization.

In a possible implementation, the method further includes: receiving information related the expiration of the UL synchronization validity timer from the UE, in which the information related the expiration includes at least one of: a system frame number, a hyper frame number or a subframe number when the UL synchronization validity timer expires; a corresponding time when the UL synchronization validity timer expires; or a remaining duration of the UL synchronization validity timer from the expiration.

According to a third aspect of embodiments of the disclosure, a communication apparatus is provided. The communication apparatus may be configured to perform steps executed by a UE in the above first aspect or any one possible design of the above first aspect. The UE may achieve functions of the above methods in the form of a hardware structure, a software module, or a combination of a hardware structure and a software module.

When the communication apparatus according to the third aspect is implemented by the software module, the communication apparatus may include a transceiving module. The transceiving module is configured to support the communication apparatus to perform the communication.

When steps of the above first aspect are executed, the transceiving module is configured to, in response to an expiration of a UL synchronization validity timer related to TA pre-compensation reference information, determining that the TA pre-compensation reference information is invalid, and initiating an RLF procedure or a non-RLF procedure to acquire a system message carrying the TA pre-compensation reference information; in which the TA pre-compensation reference information includes at least one of ephemeris information or a common TA.

According to a fourth aspect of embodiments of the disclosure, a communication apparatus is provided. The communication apparatus may be configured to perform steps executed by a network device in the above second aspect or any one possible design of the above second aspect. The network device may achieve functions of the above methods in the form of a hardware structure, a software module or a combination of a hardware structure and a software module.

When the communication apparatus according to the fourth aspect is implemented by the software module, the communication apparatus may include a transceiving module. The transceiving module is configured to support the communication apparatus to perform the communication.

When steps of the above second aspect are executed, the transceiving module is configured to, in response to a UE initiating an RLF procedure or a non-RLF procedure, transmitting a system message carrying TA pre-compensation reference information to the UE; in which the TA pre-compensation reference information includes at least one of ephemeris information or a common TA, and the UE is configured to initiate the RLF procedure or the non-RLF procedure when determining the TA pre-compensation reference information is invalid in response to an expiration of the UL synchronization validity timer related to the TA pre-compensation reference information.

According to a fifth aspect of embodiments of the disclosure, a communication device is provided and includes a processor and a memory; in which the memory is configured to store a computer program; and when the computer program is executed by the processor, the above first aspect or any one possible design of the above first aspect is implemented.

According to a sixth aspect of embodiments of the disclosure, a communication device is provided and includes a processor and a memory; in which the memory is configured to store a computer program; and when the computer program is executed by the processor, the above second aspect or any one possible design of the above second aspect is implemented.

According to a seventh aspect of embodiments of the disclosure, a computer-readable storage medium including instructions (or referred to as a computer program or a program) is provided. When the instructions are called and executed on a computer, the computer is caused to perform the first aspect or any one possible design of the first aspect.

According to an eighth aspect of embodiments of the disclosure, a computer-readable storage medium including instructions (or referred to as a computer program or a program) is provided. When the instructions are called and executed on a computer, the computer is caused to perform the second aspect or any one possible design of the second aspect.

What is claimed is:

1. A method for uplink (UL) synchronization, performed by a user equipment (UE), comprising:

determining an expiration of a UL synchronization validity timer related to timing advance (TA) pre-compensation reference information;

after the UL synchronization validity timer expires, receiving by a media access control (MAC) layer notification information for indicating the expiration of the UL synchronization validity timer from a radio resource control (RRC) layer, performing at least one of: clearing all hybrid automatic repeat request (HARQ) cache of a serving cell, or disabling any UL transmission; and initiating a non-radio link failure (non-RLF) procedure to acquire a system message carrying the TA pre-compensation reference information when the UE is in a connected state;

wherein the TA pre-compensation reference information comprises at least one of ephemeris information or a common TA, and ensuring that a first system message carrying the TA pre-compensation reference information is valid.

2. The method according to claim 1, wherein initiating the non-RLF procedure to acquire the system message carrying the TA pre-compensation reference information comprises:

determining that a preset system message is invalid; and initiating the non-RLF procedure to acquire the system message carrying the TA pre-compensation reference information;

wherein the preset system message comprises the system message carrying the TA pre-compensation reference information.

3. The method according to claim 1, further comprising:

determining whether or not it is capable of acquiring the preset system message based on an implementation procedure of the UE.

4. The method according to claim 1, further comprising:

determining that the system message carrying the TA pre-compensation reference information is not acquired within a set duration after the UL synchronization validity timer expires; and determining that the UE is not capable of acquiring the system message carrying the TA pre-compensation reference information.

5. The method according to claim 1, further comprising:

determining that the UE is not capable of acquiring the preset system message; and initiating a connection reestablishment, or returning to an idle state after executing a procedure of leaving a connected state.

6. The method according to claim 1, further comprising:

after the UL synchronization validity timer expires, notifying, by a radio resource control (RRC) layer, a media access control (MAC) layer to cause the UE to stop performing a UL transmission.

7. The method according to claim 1, further comprising:

after the UL synchronization validity timer expires, notifying, by a radio resource control (RRC) layer, a physical (PHY) layer to cause the PHY layer not to perform any UL transmission.

8. The method according to claim 1, further comprising:

after the UL synchronization validity timer expires, at a radio resource control (RRC) layer, performing at least one of:

releasing or disabling all physical uplink control channels (PUCCHs) or all short physical uplink control channels (SPUCCHs) of a serving cell;

releasing or disabling all semi-persistent scheduling (SPS) of a serving cell; or releasing or disabling dedicated scheduling request (SR) resources of a narrow band Internet of Things (NB-IoT).

9. The method according to claim 1, further comprising:

after acquiring latest TA pre-compensation reference information, receiving an indication of a media access control (MAC) layer that the common TA from a base station is acquired, and at a radio resource control (RRC) layer, performing at least one of:

recovering all disabled physical uplink control channels (PUCCHs) or all disabled short physical uplink control channels (SPUCCHs) of a serving cell;

recovering all disabled semi-persistent scheduling (SPS) of a serving cell; or recovering all disabled dedicated scheduling request (SR) resources of a narrow band Internets of Things (NB-IoT).

10. The method according to claim 1, wherein after the UL synchronization validity timer expires, receiving by the MAC layer notification information for indicating the expiration of the UL synchronization validity timer from the RRC layer, performing further at least one of:

clearing or disabling all configured downlink (DL) configurations and UL grants;

initiating a random access;

disabling any UL transmission other than a random access;

notifying the RRC layer after acquiring the common TA; or recovering disabled configured DL configurations and UL grants after acquiring the common TA.

11. The method according to claim 1, further comprising:

transmitting information related the expiration of the UL synchronization validity timer to a network device, wherein the information related the expiration comprises at least one of:

a system frame number, a hyper frame number, or a subframe number when the UL synchronization validity timer expires;

a corresponding time when the UL synchronization validity timer expires; or a remaining duration of the UL synchronization validity timer from the expiration.

12. The method according to claim 1, further comprising:

returning to an idle state after the UE executes a procedure of leaving a connected state.

13. A method for uplink (UL) synchronization, performed by a first network device, comprising:

determining a user equipment (UE) initiating a non-radio link failure (non-RLF) procedure; and transmitting a system message carrying timing advance (TA) pre-compensation reference information to the UE;

wherein the TA pre-compensation reference information comprises at least one of ephemeris information or a common TA, wherein the UE is configured to in response to an expiration of the UL synchronization validity timer related to the TA pre-compensation reference information and receiving by a media access control (MAC) layer notification information indicating the expiration of the UL synchronization validity timer from a radio resource control (RRC) layer, perform at least one of: clearing all hybrid automatic repeat request (HARQ) cache of a serving cell, or disabling any UL transmission;

wherein the UE initiates the non-RLF procedure when it is in a connected state; and the UE is further configured to ensure that a first system message carrying the TA pre-compensation reference information is valid.

14. The method according to claim 13, further comprising:

receiving information related the expiration of the UL synchronization validity timer from the UE, wherein the information related the expiration comprises at least one of:

a system frame number, a hyper frame number or a subframe number when the UL synchronization validity timer expires;

a corresponding time when the UL synchronization validity timer expires; or a remaining duration of the UL synchronization validity timer from the expiration.

15. A communication device, comprising:

a processor; and a memory, wherein the memory is configured to store a computer program; and the processor is configured to execute the computer program, to carry out:

determining an expiration of a UL synchronization validity timer related to timing advance (TA) pre-compensation reference information;

after the UL synchronization validity timer expires, receiving by a media access control (MAC) layer notification information for indicating the expiration of the UL synchronization validity timer from a radio resource control (RRC) layer, performing at least one of: clearing all hybrid automatic repeat request (HARQ) cache of a serving cell, or disabling any UL transmission; and initiating a non-radio link failure (non-RLF) procedure to acquire a system message carrying the TA pre-compensation reference information when the UE is in a connected state;

wherein the TA pre-compensation reference information comprises at least one of ephemeris information or a common TA, and ensuring that a first system message carrying the TA pre-compensation reference information is valid.

16. A communication device, comprising:

a processor; and a memory, wherein the memory is configured to store a computer program; and the processor is configured to execute the computer program, to carry out the method according to claim 13.

17. A non-transitory computer-readable storage medium storing instructions, wherein when the instructions are called and executed on a computer, the computer is caused to perform the method according to claim 1.

18. The method according to claim 1, further comprising:

after the UL synchronization validity timer expires, determining that the TA pre-compensation reference information is invalid.

19. The method according to claim 1, further comprising: the UE does not initiate a random access before acquiring the TA pre-compensation reference information.

20. The method according to claim 1, further comprising: without ensuring that a second system message not carrying the TA pre-compensation reference information is valid.

* * * * *